United States Patent Office 3,430,922
Patented Mar. 4, 1969

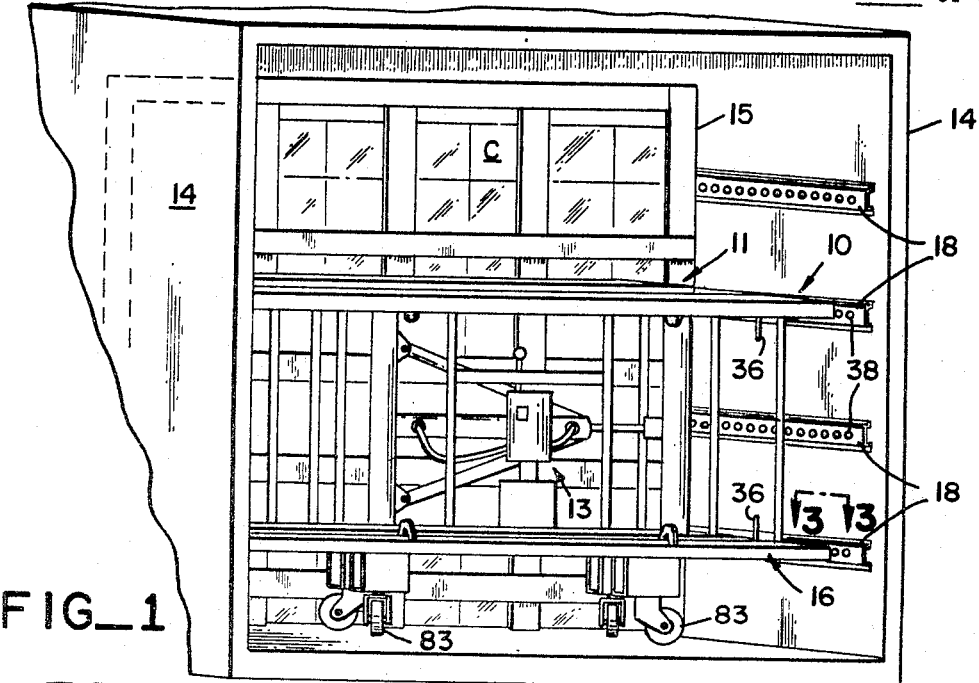
FIG_1
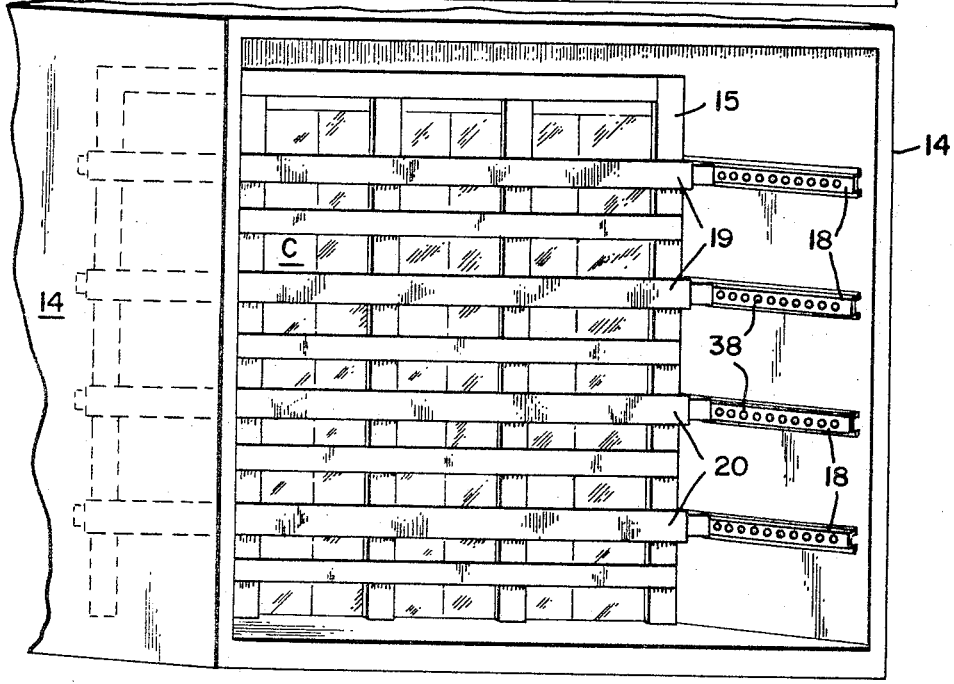
FIG_2
INVENTOR.
KENNETH H. SPENCER
ATTORNEYS

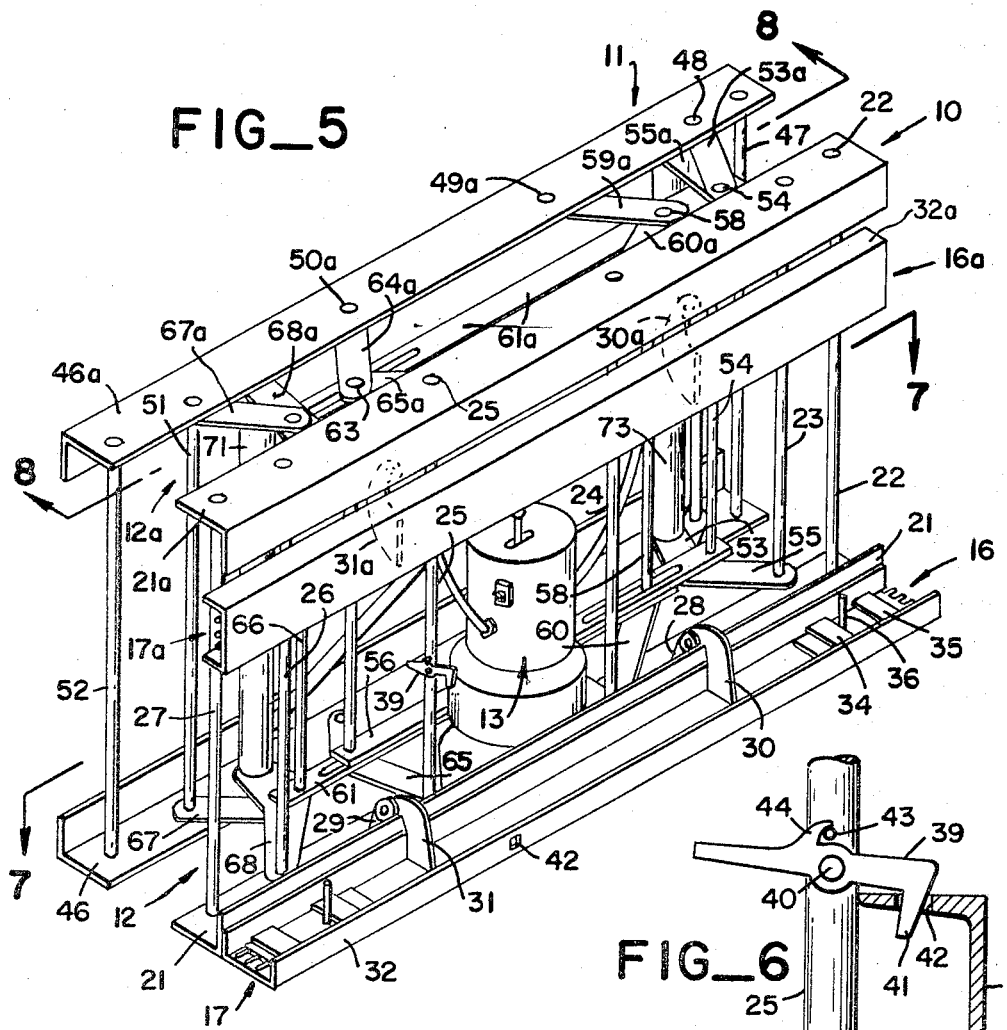

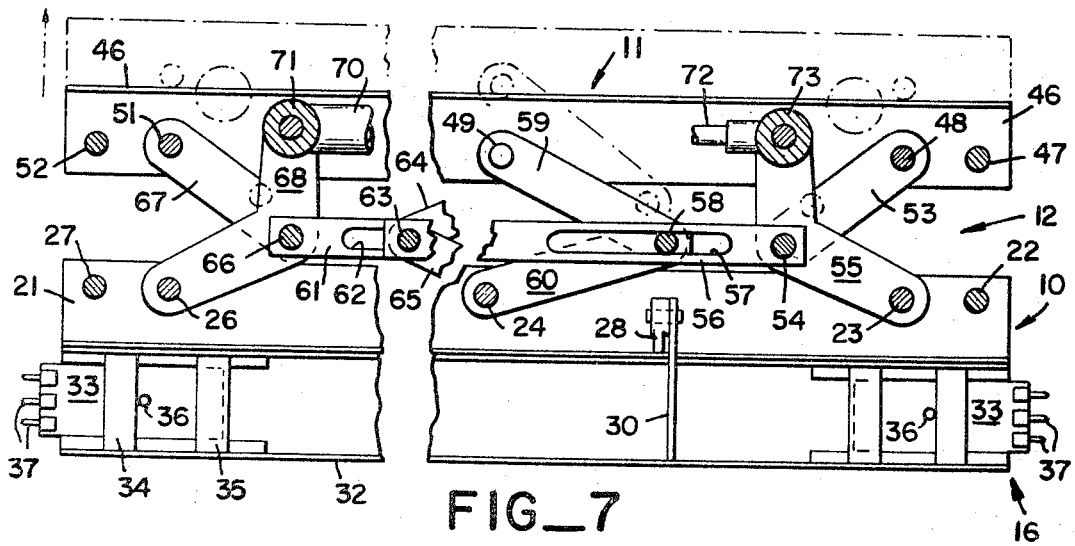
FIG_7
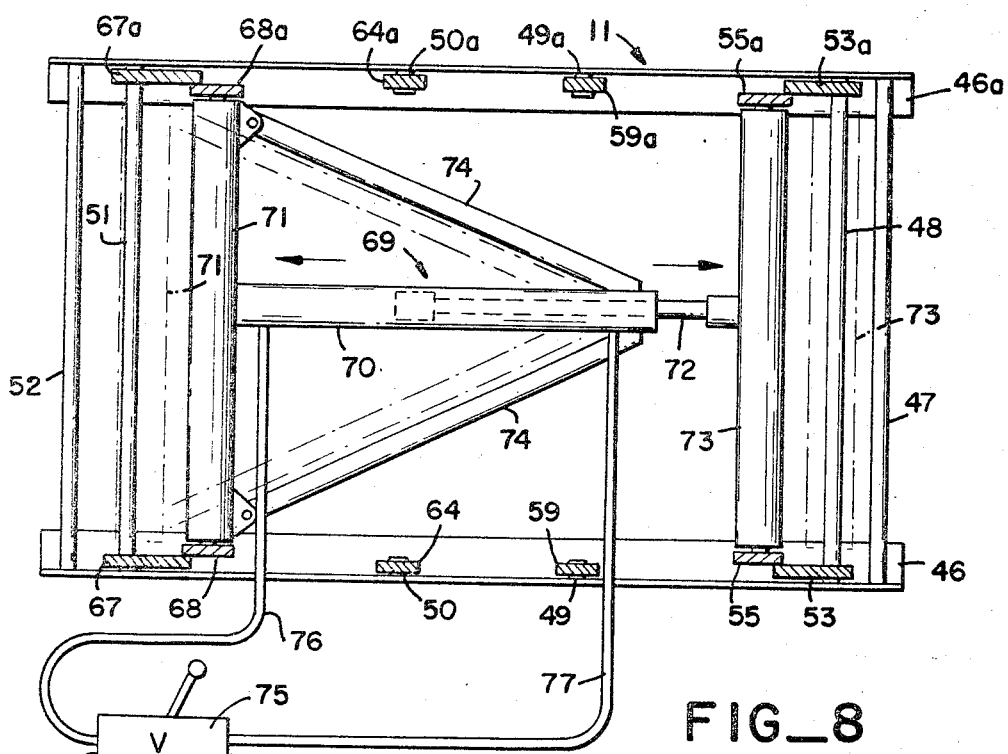
FIG_8

3,430,922
LOAD COMPACTOR
Kenneth H. Spencer, Penryn, Calif., assignor to Beckett Manufacturing Co., Penryn, Calif., a corporation of California
Filed June 30, 1967, Ser. No. 650,431
U.S. Cl. 254—93
Int. Cl. B66f 3/36
12 Claims

ABSTRACT OF THE DISCLOSURE

A compactor is adapted to be positioned adjacent to a stacked load or cargo and expanded to compress the load for transportation purposes. The compactor comprises a first frame arranged to be secured to a stationary wall partially defining a load carrying chamber, a second frame operatively connected to the first frame and actuating means for selectively expanding the compactor to compress the load.

Background of the invention

The transportation of stacked boxes and the like in a mobile vehicle gives rise to breakage and related problems when such a load is not firmly secured therein. Cables and various bracing arrangements have been proposed for the purpose of compacting and tying down the load to overcome the above problems, primarily occasioned by the vibrations generated in the vehicle during transportation.

The present invention overcomes such problems by providing an inexpensive compactor which will expeditiously compress a load to facilitate firm securance thereof in a mobile vehicle. In addition, the non-complex compactor can be operated by a semi-skilled workman and requires very little set-up time and servicing.

Summary of the invention

The load compactor of this invention comprises first and second members or frames operatively connected together by a suitably arranged linkage means. The first frame preferably has a locking means arranged thereon adapted to attach the frame to a stationary wall partially defining a load-carrying chamber of a transport vehicle. The linkage means is preferably arranged to maintain the the frames substantially parallel with respect to each other during expansion thereof. An actuating means is arranged to selectively expand the frames whereby the second frame compresses the load a predetermined amount against a second stationary or backup wall of the transport vehicle.

Brief description of the drawings

FIG. 1 is a view illustrating the preferred load compactor embodiment of this invention as it would appear in a load carrying chamber of a transport vehicle;

FIG. 2 is a view of the load carrying chamber after the compactor has been removed therefrom and stationary rails substituted therefor to secure the load in position for transportation purposes;

FIG. 3 is a top plan view of a locking means taken in the direction of arrows 3—3 in FIG. 1;

FIG. 4 is a view simiar to FIG. 3, but illustrating the locking means in its retracted or unlocked position;

FIG. 5 is an isometric view of the load compactor;

FIG. 6 is a side elevational view of a latching means utilized to latch a pivoted channel bar of the load compactor in a stored position;

FIG. 7 is a broken view of a linkage means employed in the compactor taken in the direction of arrows 7—7 in FIG. 5; and FIG. 8 is a view taken in the direction of arrows 8—8 in FIG. 5 with an actuating means for the compactor schematically added thereto.

Description of the preferred embodiment

Referring first to FIGS. 1 and 5, the preferred load compactor embodiment of this invention generally comprises first and second members or frames 10 and 11 operatively connected together by linkage means generally shown at 12 and 12a. As will be hereinafter more fully described, the linkage means is arranged to maintain the frames substantially parallel with respect to each other when an actuating means 13 is energized to expand same. The top and bottom portions of the compactor are constructed and arranged in a substantially similar manner. Therefore, descriptive emphasis will be primarily directed to the elements of such bottom portion with like numerals (accompanied by a subscript "a") depicting identical elements of the top portion.

The load compactor of FIG. 5 may be positioned in the load carrying chamber defined by a body 14 of a mobile vehicle, such as a truck. A movable, wooden frame 15 may be positioned between cargo C and the compactor to evenly distribute the force of the compactor over the load. A stationary backup wall (not shown) of the truck body is positioned forwardly of the load in a conventional manner. Four identical locking means 16, 17, 16a and 17a are suitably mounted on first frame 10 to detachably secure the frame to rails 18, mounted on opposed stationary side walls of the truck body.

Thus, when actuating means 13 is energized, second frame 11 will move frame 15 against the load to compress and compact the load against the above-mentioned backup wall of the truck body. Referring to FIG. 2, upper two braces 19 are then suitably attached to stationary rails 18 (only the rails on one of the side walls are illustrated) to maintain frame 15 and the load in position. Thereafter, the compactor is removed from the truck and two lower braces 20 are attached to rails 18 to ready the load for transport to a desired destination.

FIGS. 3–8 disclose the more specific constructions and arrangements of the preferred compactor embodiment. First frame 10 comprises spaced angle bars 21 and 21a attached together by means of upstanding rods 22–27. Bar 21 has brackets 28 and 29 secured thereto and arranged to pivotally mount lugs 30 and 31, respectively, thereon. The lugs are secured to a channel bar 32 which carries identical locking means 16 and 17 on each end thereof.

Referring briefly to FIGS. 3 and 4, locking means 16, for example, comprises a flat plate 33 slidably mounted in bar 32 and retained therein by spaced brackets 34 and 35, secured to the bar. An upstanding rod or handle 36 is secured to plate 33 between the brackets to permit manual movement of the plate between the FIGS. 3 and 4 positions. The rightward end of the plate carries locking pins 37 thereon adapted to engage a preselected group of apertures 38, suitably formed in rails 18 for purposes above described. Braces 19 and 20 may each comprise locking means, similar to locking means 16, on each end thereof for purposes of securing the braces to rails 18 (FIG. 2).

Referring to FIGS. 5 and 6, a latching member 39 may be suitably mounted on rod 25 by a pivot pin 40 to have latch portion 41 thereof engage an aperture 42 formed in member 32 when the member is pivoted upwardly from its FIG. 5 to its FIG. 6 position. A stop pin 43 may be secured to rod 25 to engage a stop lug 44 of the latch member to limit clockwise movement thereof. Such a latching arrangement may be utilized when the compactor is not in use. It should be noted that upper channel bar need not comprise such a latching arrangement since the bar will pivot to a collapsed condition under the influence of gravity.

The second member or frame 11 is substantially identical to the above described first frame and comprises spaced parallel angle bars 46 and 46a attached together by upstanding rods 47, 48, 51 and 52. Pivot pins 49a and 50a project through bar 46 for purposes hereinafter explained. It can be seen that the front faces of the bars form substantially large and flat surface portions arranged to engage frame 15 (FIG. 1) during the load compacting operation.

The linkage means operatively connecting frames 10 and 11 together will now be described. As suggested above, the top portion of the compactor is substantially identical to the bottom portion thereof and therefore, only the bottom linkage means will be fully described. In addition, it will be noted that the construction and arrangement of the left and right sides of the integrated linkage means are substantially identical.

Referring more particularly to FIGS. 5 and 7, rod 48 pivotally mounts the first end of a link 53 thereon. The second end of the link is pivoted on a floating rod 54. The first end of a lever 55 is pivotally mounted on rod 23, secured to angle bar 21, and is further pivotally mounted at a midportion thereof to rod 54. The rod further has a first end of a slidable bar member 56 pivotally mounted thereon. A lost motion slot 57 is formed in the bar and carries a second floating rod 58 therein. The latter rod pivotally mounts links 59 and 60 thereon.

Link 59 is pivotally mounted on pin 49, secured to bar 46, whereas link 60 is pivotally mounted on rod 24, secured to bar 21. As more clearly shown in FIG. 5, rod 54 is arranged to extend upwardly to pivotally mount links 53a and 55a of the top linkage means thereon, the links corresponding to links 53 and 55, respectively, of the described bottom linkage means. Also rod 58 is arranged to extend upwardly and engage a slot 57a of a link 56a in the same manner as above described for the bottom linkage means.

Referring once again to FIG. 7, the left side of the bottom linkage means comprises a second slidable bar member 61 arranged to underlie a substantial portion of the first bar member. The right end of the second bar member is pivotally mounted on rod 58. The second end of the second bar member has a lost motion slot 62 formed therein arranged to receive a third floating rod 63 which pivotally mounts the left end of bar 56 and links 64 and 65 thereon.

The latter links are pivotally mounted by pin 50 and rod 25 on angle bars 46 and 32, respectively, as illustrated in FIG. 5. The left end of bar 61 is pivoted on a fourth floating rod 66 which also pivotally mounts a link 67 and second lever 68 thereon. The link and lever are pivotally mounted on rods 51 and 26, respectively. Thus it can be seen that the construction and function of the left end of the bottom linkage means are substantially identical to the right end thereof.

As schematically illustrated in FIG. 8, actuating means 13 for expanding frame 11 relative to frame 10 comprises a double-acting hydraulic ram 69. The ram's cylindrical casing 70 is secured to a vertically disposed post 71 and its rod end 72 is secured to a second parallel post 73. The lower ends of posts 71 and 73 may be pivotally mounted or otherwise attached to the free ends of levers 68 and 55, respectively. Rods 63 and 66 and posts 71 and 73 are operatively connected to identical elements forming the top linkage means. Braces 74 may be secured to post 71 and the ram's casing to afford structural integrity thereto.

A conventional four-way valve 75 is suitably arranged to selectively expand or retract ram 69 via conduit 76 or 77, respectively. The valve communicates with a reservoir 78 to communicate pressurized fluid to the ram by means of an electric drive motor 79, suitably arranged to drive a hydraulic pump 80. The motor is suitably connected to an electrical power source (not shown) when the compactor is readied for operation. Exhaust conduits 81 and 82 are arranged in a conventional manner to automatically exhaust one end of the ram via valve 75 when the other end is pressurized.

In operation, when it is desired to expand frame 11 of the compactor to the dotted position illustrated in FIG. 7, the handle of valve 75 is moved to the rightward position illustrated in FIG. 8. Pressurized fluid is then communicated from reservoir 78 to the head end of ram 69 via conduit 76. Simultaneously therewith, the pressurized fluid in the rod end of the ram is exhausted to the reservoir via conduits 77 and 82. When the ram is extended, bars 71 and 73 will move away from each other to pivot lever 55 clockwise about its pivot axis 23 and lever 68 counter-clockwise about its pivot axis 26 (FIG. 7). Rods 54 and 66 move away from each other to in turn pivot centering links 53 and 67.

Thus it can be seen that a substantial toggle effect will function to precisely move frame 11 to the dotted line position illustrated in FIG. 7. Simultaneously with such actuation, parallel linkages 59, 60, 64 and 65 and sliding bars 56 and 61 will aid links 53 and 67 in maintaining frames 10 and 11 in substantial parallel relationship with respect to each other and to limit the amount of compactor expansion. The bars and slots are preferably constructed and arranged to stop the extension of the ram after it has been expanded a predetermined amount. The valve can be, of course, manipulated in a conventional manner to closely control the extent of ram extension and contraction.

A plurality of casters 83 (FIG. 1) may be attached to the bottom of frames 10 and 11 to increase the mobility of the compactor. It should be understood that in certain applications the compactor could be redesigned to employ only the top 12a or bottom 12 linkage means. Such a single linkage means could be repositioned midway between the top and bottom of the compactor, for example. Other modifications, such as placing locking means 16, 16a, 17 and 17a on the opposite ends of angle bars 21 and 21a, are also within the scope of the invention claimed hereinafter. In addition, a locking means (not shown) may be operatively connected to lug 30a (FIG. 5) and bracket 28a (not numbered) to lock bar 32a in its horizontally disposed FIG. 1 position. Such a locking means could comprise a manually actuated lever having a first end pivoted to the bracket and a link pivotally mounted to a midportion of the lever and to lug 30a. Upon pivoting of the lever, the pivot points for the link can be arranged in "over-center" relationship to lock the bar in such horizontal position in accordance with well known skill of the art principles. In certain loading applications it should be understood that the compactor could be placed partially outside of the load carrying chamber, such as on a forklift or loading dock. In the latter case rails similar to rails 18 (FIG. 1) could be affixed to the loading dock to accommodate locking means 16, 16a, 17 and/or 17a.

I claim:

1. A load compactor comprising a first member, a second member positioned adjacent to said first member, linkage means arranged to attach said first and second members together to maintain said members substantially parallel with respect to each other when relative movement occurs therebetween, actuating means arranged to selectively move said first and second members relative to each other, a bar pivotally mounted on said first member and locking means, including a member slidably mounted on said bar, adapted to attach said first member to a stationary wall.

2. The invention of claim 1 wherein said actuating means comprises an extensible ram means operatively connected to said first and second members.

3. The invention of claim 2 wherein said actuating means further comprises a manually actuated valve means operatively associated with said ram means for selectively extending or retracting said ram means.

4. The invention of claim 2 wherein said ram means is operatively connected to said first and second members by means of said linkage means.

5. The invention of claim 1 wherein said first and second members each comprise a substantially rectangular frame, said linkage means comprising interconnected top and bottom linkage means arranged to attach the top and bottom portions of said frames together, respectively.

6. The invention of claim 1 wherein said linkage means comprises spaced first and second links pivotally connected at first ends thereof to said second member and spaced first and second levers pivotally connected at first ends thereof to said first member, said actuating means connected to and arranged between second ends of said levers, a second end of each of said first and second links pivotally connected to a respective one of said first and second levers between the first and second ends thereof whereby extension of said actuating means will expand said first and second members.

7. The invention of claim 6 wherein said linkage means further comprises a first slidable bar member pivotally attached at a first end thereof to the second end of said first link and a second slidable bar member pivotally attached at a first end thereof to the second end of said second link and lost motion connection means operatively connecting said first and second bar members together for permitting said bar members to slide relative to each other when said actuating means moves said first and second members relative to each other.

8. In a load compactor comprising a first member, a second member, linkage means attaching said first and second members together to maintain said members substantially parallel with respect to each other when relative movement occurs therebetween, said linkage means comprising spaced first and second links pivotally connected at first ends thereof to said second member and spaced first and second levers pivotally connected at first ends thereof to said first member, a second end of each of said first and second links pivotally connected to a respective one of said first and second levers between the first and second ends thereof and actuating means operatively connected solely to the second ends of said levers for selectively expanding said first and second members.

9. The invention of claim 8 wherein said actuating means comprises an extensible ram means.

10. The invention of claim 8 wherein said linkage means further comprises a first slidable bar pivotally attached at a first end thereof to said first lever and a second slidable bar pivotally attached at a first end thereof to said second lever and lost motion connection means operatively connecting said first and second bars together for permitting said bars to slide relative to each other when said actuating means moves said first and second members relative to each other.

11. In a load compactor comprising a first member, a second member, linkage means attaching said first and second members together to maintain said members substantially parallel with respect to each other when relative movement occurs therebetween, said linkage means including first and second bars disposed between and substantially parallel with respect to said first and second members and lost motion connection means operatively connecting said first and second bars together for permitting said bars to slide relative to each other to aid in maintaining said first and second members substantially parallel when they are expanded, and actuating means for selectively expanding said first and second members.

12. The invention of claim 11 wherein said actuating means comprises an extensible ram operatively connected solely to said linkage means.

References Cited

UNITED STATES PATENTS

| | | | |
|---|---|---|---|
| 986,589 | 3/1911 | Parker | 105—369 |
| 1,517,100 | 11/1924 | Bacon. | |
| 2,086,283 | 7/1937 | Pierce | 105—369 |
| 2,206,788 | 7/1940 | Meacham | 254—9 XR |
| 2,529,588 | 11/1950 | Beckett | 105—369 |
| 2,846,102 | 8/1958 | Connor | 214—620 XR |
| 3,063,387 | 11/1962 | Schrogder et al. | 105—369 |

GERALD M. FORLENZA, *Primary Examiner.*

F. WERNER, *Assistant Examiner.*

U.S. Cl. X.R.

214—10.5; 105—369